Aug. 11, 1953        L. J. GORDON ET AL        2,648,131
COMPASS RULE
Filed Nov. 23, 1949        2 Sheets-Sheet 1
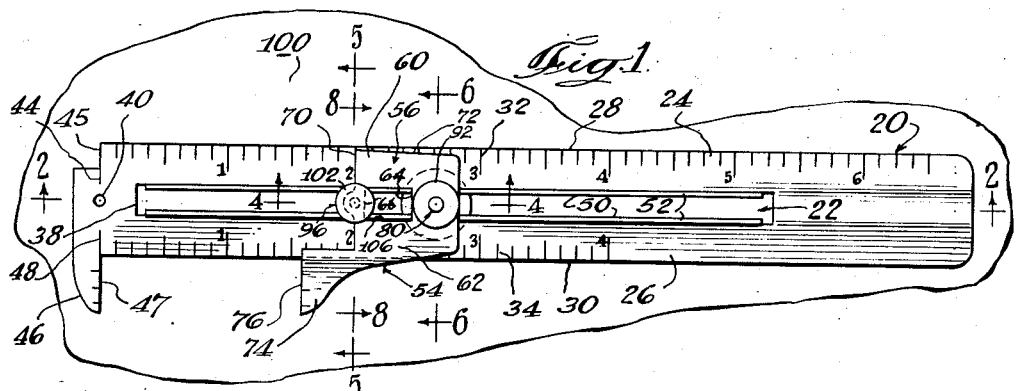
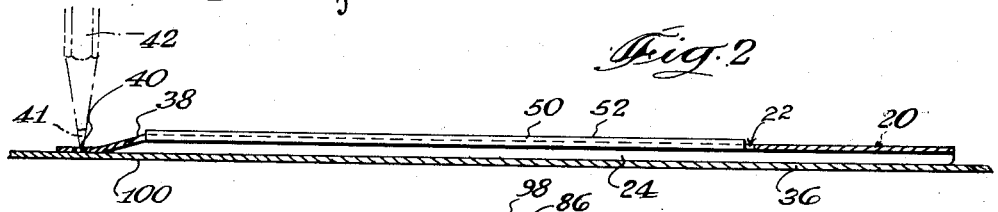
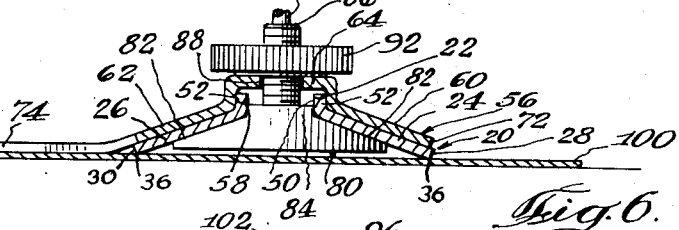
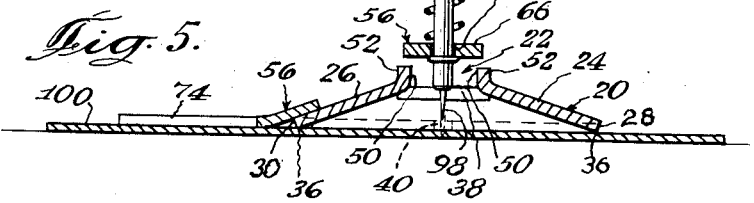
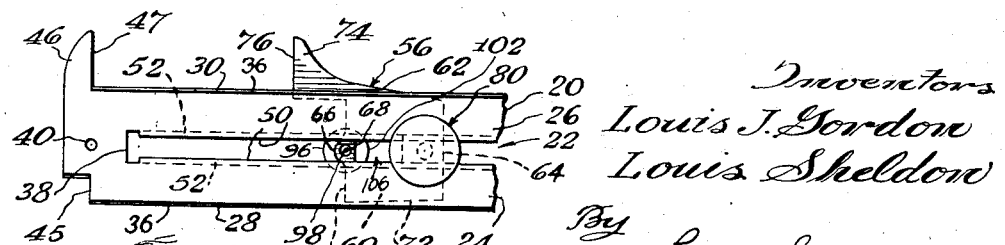
Inventors
Louis J. Gordon
Louis Sheldon
By Louis Sheldon
Attorney Aug. 11, 1953   L. J. GORDON ET AL   2,648,131
COMPASS RULE
Filed Nov. 23, 1949   2 Sheets-Sheet 2
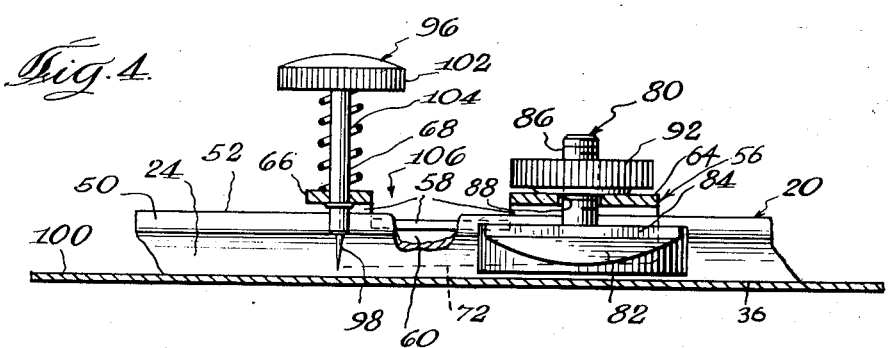
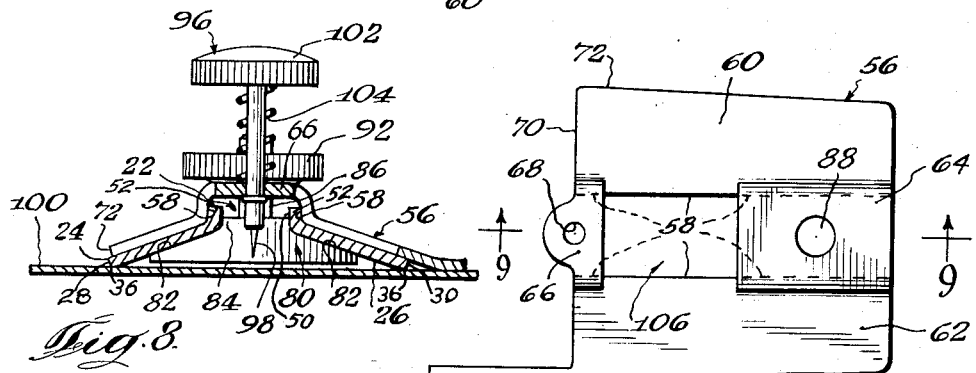
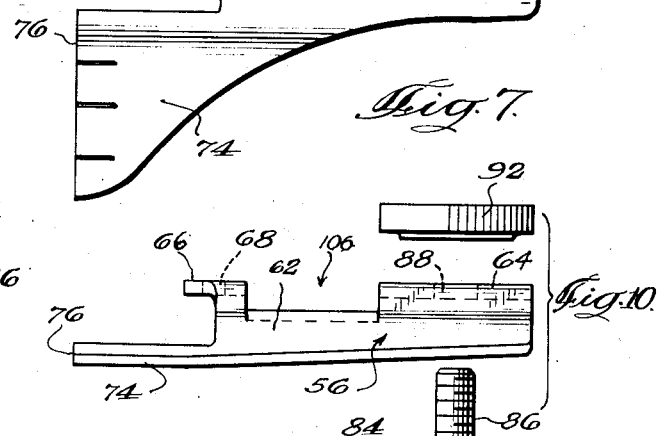
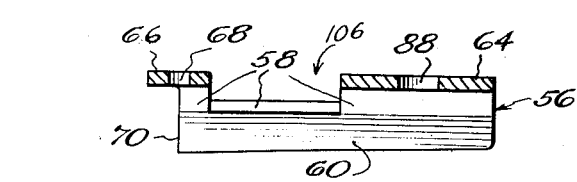
Inventors
Louis J. Gordon
Louis Sheldon
By Louis Sheldon
attorney Patented Aug. 11, 1953

2,648,131

UNITED STATES PATENT OFFICE 2,648,131

COMPASS RULE

Louis J. Gordon and Louis Sheldon, Chicago, Ill.;
said Sheldon assignor to said Gordon Application November 23, 1949, Serial No. 128,972

4 Claims. (Cl. 33—27)

This invention relates to rules, compasses and the like, and concerns improvements in the subject matter of Louis J. Gordon, Patent No. 2,438,337, dated March 23, 1948, entitled "Combination Rule and Compass."

It is an object of our invention to provide a compass rule which may be manufactured at substantially less cost than the device disclosed in said patent.

Another object of our invention is to provide a compass rule so constructed that the rule presents an unobstructed straight-edge.

A further object of the invention is to provide a combined compass and caliper.

An additional object is to provide a device capable of use as a rule, compass and caliper.

Further objects and advantages of the invention will appear as the description proceeds.

The invention will be better understood upon reference to the following description and accompanying drawings, in which:

Fig. 1 is a top plan view of a compass and caliper rule in accordance with the invention and shown resting on a work sheet.

Fig. 2 is a sectional view taken as indicated by the line 2—2 in Fig. 1, the slider being omitted.

Fig. 3 is a fragmentary bottom plan view of the device.

Fig. 4 is an enlarged sectional view taken as indicated by the line 4—4 in Fig. 1.

Figs. 5 and 6 are sectional views taken as indicated by the lines 5—5 and 6—6 in Fig. 1.

Fig. 7 is a plan view of the slider, on a reduced scale.

Fig. 8 is an end elevational view taken as indicated by the line 8—8 in Fig. 1.

Fig. 9 is a sectional view taken as indicated by the line 9—9 in Fig. 7.

Fig. 10 is an exploded view of the slider parts.

Fig. 11 is a top plan view of the slider stud, taken as indicated by the line 11—11 in Fig. 10.

Referring now more particularly to the drawings, showing an illustrative embodiment of the invention, there is indicated at 20 a rule body preferably formed of a single piece of sheet aluminum or other suitable material, having a closed center longitudinal slot 22 dividing the body essentially into two bars 24 and 26 having straight-edges 28 and 30, at which are provided scales 32 and 34, respectively, said bars being inclined transversely from said slot as shown in Figs. 5, 6 and 8, so that the outer lower corner edges 36 of said bars define the bottom of the body, said slot accordingly being substantially elevated from said bottom. Preferably beyond one end 38 of the slot 22, the body 20 is formed with an aperture 40 for the reception of the point 41 of a pencil 42, the axis of said aperture intersecting the projected zero line 44 of the scale 32, said zero line being preferably coincident with an end edge 45 of the body defining an end of the straight-edge 28. The body 20 has an extension 46 with an inner edge 47 in line with the zero line 48 of the scale 34. The inner margins of the bars 24 and 26, defining the sides of the slot 22, are bent upward to provide slot sides 50 of increased height and upstanding tongues or lips 52.

A slider 54 is provided to slide in and along the slot 22 for purposes which will appear hereinafter. The slider 54 comprises an upper frame-like plate 56 which may be formed of sheet aluminum or other suitable material and has mutually facing walls 58 preferably throughout its length which slidably engage the lips 52. The plate 56 is substantially C-shaped, with arms 60 and 62 and an intermediate portion 64 connecting said arms at one end, the other ends of said arms being connected by a preferably relatively narrow strip 66 having a hole 68 substantially at its center, over the slot 22, the plane of the axes of said hole and the aperture 40 being preferably parallel to the straight-edge 28. The axis of the hole 68 intersects the projected end 70 of the plate arm 60, so that the distance of said axis from the axis of the aperture 40 is measured along the straight-edge 28 by said arm end. The outer edge 72 of the arm 60 is preferably flush with or spaced inward from the straight-edge 28 in order not to interfere with the drawing of a continuous line throughout the length of said straight-edge. The arm 62 may have an extension 74 with an edge 76 parallel to the edge 47 of the body extension 46 and disposed adjacent the scale 34 so as to measure the distance between said edges, said extensions thereby serving as a caliper. The extensions 46 and 74 are useful also in measuring the hem of a skirt, etc.

The slider 54 also includes a stud 80 elevated above the bottom of the rule body 20 and having tapered inner head surfaces 82 under the bars 24 and 26 adjacent the slot 22 and formed with a center key 84 adapted to slidably engage the sides 50 of the slot. The stud 80 has a threaded shank 86 extending upward from the key 84 through a hole 88 in the plates bridge 64 and receiving a nut 92 which may be loosened to permit the slide 54 to be moved freely along the body 20 and may be tightened to clamp the slider at any desired position along the body.

A pin 96 is disposed in the bridge hole 68 and has a point 98 which is engageable with the work 100—for example a sheet of paper or fabric—in response to downward pressure on the pin head 102, said pin, in the absence of such pressure, being yieldably held in an elevated position out of contact with the work by a spring 104 disposed between the pin and the bridge 66. The bridge 66 is preferably narrow and the plate opening 106 is of substantial extent lengthwise of the slot 22, allowing ample space to enable the user to sight the pinpoint 98 from both sides and thus enable him to locate the pinpoint with ease and precision at any preselected point on the work 100.

Assuming it is desired to draw a circle of a predetermined radius on a piece of work 100, it is necessary for the user merely to loosen the nut 92, slide the slider 54 until the end 70 of the plate arm 60 is at the predetermined position on the scale 32, tighten the nut 92, press the pinpoint 98 into the work, place a pencil point 41 in the body aperture 40, and apply a torque on the pencil to describe a circle 110 about said pinpoint. If, after the device has been removed or shifted to another position, it is desired to describe another circle about the same center 112, this is very readily done due to the ease with which the pinpoint 98 can be located in that center. The slider 54 is elevated above the bottom of the body 20, so that, when the pinpoint 98 is depressed into the work, the device is rotatable with substantially no resistance. The slider is easily movable along the body without resistance by the work when the body rests thereon and the pinpoint is free of the work.

Various modifications may suggest themselves to those skilled in the art without departing from the spirit of our invention. Hence we do not wish to be restricted to the specific form shown or uses mentioned, except to the extent indicated in the appended claims.

We claim:

1. A compass rule comprising a body having a straight longitudinal slot above the bottom of said body and dividing said body into a pair of bars, one of said bars having a ruled straight edge, a slider slidably keyed to and carried by said body and comprising a plate having a bridge extending over and across said slot and a pair of arms extending from the ends of said bridge and disposed beyond said slot and overlying said bars, said bridge having a hole registering with said slot, said slider including a stud underlying said bars and having a shank extending upward through said slot and hole, said shank being threaded, a nut engaged with said shank and engageable with the upper side of said bridge and operative to clamp said slider in any desired fixed position relative to said body, a narrow second bridge extending above and across said slot and connected to said arms in substantially spaced relation to the first-mentioned bridge, a pin having a center point and mounted in and readily visible below said second bridge over said slot and extending in said slot and depressible into engagement with the work, said body having a pencil point receiving aperture, the plane of the axes of said aperture and pin being parallel to said straight edge, and means on said slider cooperating with said straight edge for measuring the distance between said axes.

2. A compass rule comprising a body having a closed straight longitudinal slot above the bottom of said body and dividing said body into a pair of bars, one of said bars having a ruled straight edge, a slider carried by and slidably keyed to said body and comprising a member having a bridge extending across said slot and over said bars and arms disposed laterally beyond said slot and over said bars, said bridge having a hole registering with said slot, a stud having a head disposed under said bars and a threaded shank extending upwardly through said hole, a nut engaged with said shank and engageable with the upper side of said bridge and operative to clamp said member in any desired fixed position relative to said body, said member having a narrow second bridge extending across said slot and connected to said arms, a center point mounted on the center of and being readily visible below said second bridge and extending in said slot and depressible into engagement with the work, said body having a pencil point receiving aperture at the zero line of said straight edge, said member cooperating with said straight edge to measure the distance between said aperture and said point.

3. A compass rule comprising a body having a straight longitudinal slot spaced from the bottom of said body and dividing said body into a pair of bars, one of said bars having a straight edge, a slider slidably keyed to and carried by said body and comprising a plate having a bridge extending over and across said slot and a pair of arms extending from the ends of said bridge and overlying said bars, clamping means associated with said bridge for retaining said slider in any desired position relative to said body, a pin support bracket carried by said slider and having an opening therein to receive a pin carried in said opening and extending into said slot and having a center point depressible into engagement with the work on which said rule rests, said support bracket being spaced from said bridge and above said slot whereby said center point of said pin is readily visible, said body having a pencil point receiving aperture, the plane of the axes of said aperture and said pin being parallel to said straight edge, and means on said slider cooperating with said straight edge for measuring the distance between said axes.

4. A compass rule comprising a body having a straight longitudinal slot spaced from the bottom of said body and dividing said body into a pair of bars having parallel straight edges, a slider slidably keyed to and carried by said body and comprising a plate having a bridge extending over and across said slot and a pair of arms extending from the ends of said bridge and overlying said bars, clamping means associated with said bridge for retaining said slider in any desired position relative to said body, a narrow pin support member carried by said slider and having an opening therein to receive a pin, a pin carried in said opening and extending into said slot and having a center point depressible into engagement with the work on which said rule rests, said support member being spaced from said bridge and substantially above said slot whereby said center point of said pin is readily visible, said body having a pencil point receiving aperture, the plane of the axes of said aperture and said pin being parallel to said straight edges, and means on said slider cooperating with one of said straight edges for measuring the distance between said axes.

LOUIS J. GORDON.
LOUIS SHELDON.

References Cited in the file of this patent

UNITED STATES PATENTS

| Number | Name | Date |
| --- | --- | --- |
| 776,897 | Ferris | Dec. 6, 1904 |
| 972,936 | Smith | Oct. 18, 1910 |
| 1,327,154 | Golden | Jan. 6, 1920 |
| 2,063,776 | Wozny | Dec. 8, 1936 |
| 2,400,407 | Gordon | May 14, 1946 |
| 2,438,337 | Gordon | Mar. 23, 1948 |
| 2,542,537 | Klemm | Feb. 20, 1951 |

FOREIGN PATENTS

| Number | Country | Date |
| --- | --- | --- |
| 77,815 | Switzerland | June 1, 1918 |